(12) United States Patent
Miyazaki et al.

(10) Patent No.: US 11,394,797 B2
(45) Date of Patent: *Jul. 19, 2022

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Satoshi Miyazaki, Kanagawa (JP); Kazuaki Toba, Kanagawa (JP); Gen Ichimura, Tokyo (JP); Kazuo Yamamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/769,486

(22) PCT Filed: Nov. 5, 2018

(86) PCT No.: PCT/JP2018/040979
§ 371 (c)(1),
(2) Date: Jun. 3, 2020

(87) PCT Pub. No.: WO2019/116777
PCT Pub. Date: Jun. 20, 2019

(65) Prior Publication Data
US 2021/0194984 A1    Jun. 24, 2021

(30) Foreign Application Priority Data
Dec. 14, 2017  (JP) .............................. JP2017-239439

(51) Int. Cl.
*H04L 67/2895* (2022.01)
*H04L 61/5007* (2022.01)
(Continued)

(52) U.S. Cl.
CPC .......... *H04L 67/2895* (2013.01); *H04L 12/46* (2013.01); *H04L 61/2007* (2013.01);
(Continued)

(58) Field of Classification Search
CPC ............... H04L 67/2895; H04L 67/288; H04L 61/2007; H04L 47/13; H04L 12/46;
(Continued)

(56) References Cited

U.S. PATENT DOCUMENTS 6,523,696 B1    2/2003  Saito et al.
7,929,538 B2 *  4/2011  Gobara ............... H04L 12/4633
                                                        709/228
(Continued)

FOREIGN PATENT DOCUMENTS

CN    103430492 A    12/2013
CN    104429025 A    3/2015
(Continued)

OTHER PUBLICATIONS

International Search Report and Written Opinion of PCT Application No. PCT/JP2018/040979, dated Jan. 29, 2019, 06 pages of ISRWO.

(Continued)

*Primary Examiner* — Gil H. Lee
*Assistant Examiner* — Chhian (Amy) Ling
(74) *Attorney, Agent, or Firm* — Chip Law Group

(57) ABSTRACT

A first communication section of an information processing device performs communication in a first segment of an IP network. A second communication section performs communication with other information processing devices via a non-IP wire interface. A proxy processing section generates a wire control command that is a control command using the wire interface on the basis of an IP control command that is a control command received from a first controller belong- (Continued)

ing to the first segment. The proxy processing section executes proxy processing on the basis of the wire control command by using the second communication section. The sharing processing section shares related information relating to a proxy control by the proxy processing section with a second information processing device belonging to a second segment.

8 Claims, 6 Drawing Sheets

(51) Int. Cl.
*H04L 67/288* (2022.01)
*H04N 21/647* (2011.01)
*H04L 12/46* (2006.01)
*H04N 21/436* (2011.01)
*H04L 9/40* (2022.01)
*H04W 4/80* (2018.01)
*H04L 67/565* (2022.01)
*H04L 69/08* (2022.01)

(52) U.S. Cl.
CPC ........ *H04L 63/0281* (2013.01); *H04L 67/288* (2013.01); *H04L 67/2823* (2013.01); *H04L 69/08* (2013.01); *H04N 21/436* (2013.01); *H04N 21/43615* (2013.01); *H04N 21/64707* (2013.01); *H04W 4/80* (2018.02)

(58) Field of Classification Search
CPC ................ H04L 63/0281; H04N 7/125; H04N 21/64707; H04N 21/436; H04W 4/80
See application file for complete search history.

(56) References Cited

U.S. PATENT DOCUMENTS

| 2012/0084452 | A1 | 4/2012 | Pettit et al. |
| 2012/0131153 | A1* | 5/2012 | Schmidt ................ H04L 61/106 709/220 |
| 2012/0185580 | A1* | 7/2012 | Detert ............... H04L 29/06027 709/223 |
| 2015/0012646 | A1* | 1/2015 | Yang .................. H04L 12/2809 709/224 |
| 2015/0351145 | A1* | 12/2015 | Burks ..................... H04W 4/80 455/41.3 |
| 2018/0375766 | A1* | 12/2018 | Filsfils ................... H04L 45/34 |
| 2019/0394194 | A1* | 12/2019 | Nakatsuru ............... H04W 4/80 |

FOREIGN PATENT DOCUMENTS

| CN | 106664226 A | 5/2017 |
| JP | 11-187061 A | 7/1999 |
| JP | 2003-345687 A | 12/2003 |
| WO | 2012/097247 A2 | 7/2012 |
| WO | 2014/063886 A1 | 5/2014 |
| WO | 2015/184382 A2 | 12/2015 |

OTHER PUBLICATIONS

Office Action for CN Patent Application No. 201880078725.9, dated Aug. 25, 2021, 7 pages of Office Action and 7 pages of English Translation.

* cited by examiner

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2018/040979 filed on Nov. 5, 2018, which claims priority benefit of Japanese Patent Application No. JP 2017-239439 filed in the Japan Patent Office on Dec. 14, 2017. Each of the above-referenced applications is hereby incorporated herein by reference in its entirety.

TECHNICAL FIELD

The present technology relates to an information processing system including a plurality of information processing devices constituting a network, an information processing device, and an information processing method.

BACKGROUND ART

At present, as a communication interface that transmits non-compressed (base band) AV data at high speed from a recorder, a set top box, or other AV (Audio Visual) sources to a television receiver (TV) or other displays, an HDMI (registered trademark, the same shall apply hereinafter) (High Definition Multimedia Interface) has been popular.

In recent years, there is an increasing case of constituting a network with a plurality of devices at home by using an IP (Internet Protocol) connection. As an example, there is a technology that a control point (for example, mobile device) controls a variety of devices such as a TV and a game device connected to an HDMI network via wireless communication such as WiFi (for example, see Patent Literature 1). In this technology, the control point performs IP packetization of a CEC (Consumer Electronics Control) command in the HDMI by using a UPnP protocol and transmits it to the device (for example, TV) in the HDMI network. In other words, the control point is capable of controlling each device in the HDMI network.

CITATION LIST

Patent Literature

Patent Literature 1: PCT International Publication No. 2014/063886

DISCLOSURE OF INVENTION

Technical Problem

Here, it is assumed that the plurality of devices wired-connected to non-IP networks including the above-described HDMI belongs to respective different IP networks. In this case, as the respective devices belonging to these segments are incapable of performing IP communication, a conflict of a non-IP control system, for example, may be generated between the devices.

It is an object of the present disclosure to provide an information processing system that can avoid the conflict of the non-IP control system between processing devices belonging to respective different IP network segments, an information processing device therein, and an information processing method.

Solution to Problem

An information processing device according to one embodiment includes a first communication section, a second communication section, a proxy processing section, and a sharing processing section.

The first communication section is configured to perform communication based on an IP in a first segment of an IP network.

The second communication section is configured to perform communication with one or more other information processing devices via a non-IP wire interface.

The proxy processing section is configured to generate a wire control command that is a control command using the wire interface on the basis of an IP control command that is a control command received from a first controller at least belonging to the first segment via the first communication section. In addition, the proxy processing section is configured to execute a proxy control on the basis of the wire control command by using the second communication section.

The sharing processing section is configured to share related information relating to the proxy control by the proxy processing section with a second information processing device belonging to a second segment different from the first segment among the one or more other information processing devices by using the second communication section.

According to the information processing device, the related information for each proxy control between the information processing device and the second information processing device is shared by using the second communication section. This allows a collision of the wire control command in the second communication section based on each IP control command to be avoided, i.e., a conflict of the non-IP control system to be avoided.

The sharing processing section may be configured to transmit first related information relating to the proxy control by the information processing device to the second information processing device as the related information, and receive second related information relating to the proxy control by the second information processing device from the second information processing device.

The sharing processing section may be configured to transmit, as the first related information, IP segment information of the first segment and list information of the wire control command corresponding to the IP control command of the first controller to the second information processing device.

The sharing processing section may be configured to receive, as the second related information, IP segment information of the second segment and list information of a wire control command corresponding to an IP control command generated at a second controller belonging to the second segment from the second information processing device.

The sharing processing section may be configured to determine whether or not a segment of the IP network to which the second information processing device belongs is different from the first segment.

The proxy processing section may be configured to receive a wire control command generated by the second information processing device on the basis of an IP control command generated by a second controller belonging to the second segment by using the second communication section, and execute the proxy control on the basis of the received wire control command.

With this configuration, the first information processing device is capable of executing the proxy control by the IP control command from the second controller via the second information processing device.

The wire control command generated on the basis of the IP control command generated by the second controller may be a command defined such that the second information processing device is incapable of executing the command.

With this configuration, even if there is a control that the second information processing device is incapable of executing, the information processing device is capable of executing the control.

An information processing method according to one embodiment is an information processing method by an information processing device including a first communication section configured to perform communication based on an IP in a first segment of an IP network and a second communication section configured to perform communication with one or more other information processing devices via a non-IP wire interface.

Related information relating to a proxy control by the information processing device is shared with a second information processing device belonging to a second segment different from the first segment among the one or more other information processing devices by using the second communication section.

A wire control command that is a control command using the wire interface is generated on the basis of an IP control command that is a control command received from a first controller at least belonging to the first segment via the first communication section.

The proxy control is executed on the basis of the wire control command by using the second communication section.

An information processing system according to one embodiment includes a first information processing device belonging to a first segment of the IP network, and a second information processing device belonging to a second segment different from the first segment of the IP network, and connected to the first information processing device via a non-IP wire interface.

The first information processing device includes the above-described first communication section, the above-described second communication section, the above-described proxy processing section, and the above-described sharing processing section.

Advantageous Effects of Invention

As described above, according to the present technology, it can avoid the conflict of the non-IP control system between the information processing devices belonging to respective different IP network segments.

It should be noted that the effects described here are not necessarily limitative and may be any of effects described in the present disclosure.

MODE(S) FOR CARRYING OUT THE INVENTION

Hereinafter, embodiments according to the present technology will be described with reference to the drawings.

1. Configuration of Information Processing System

Figure 1:
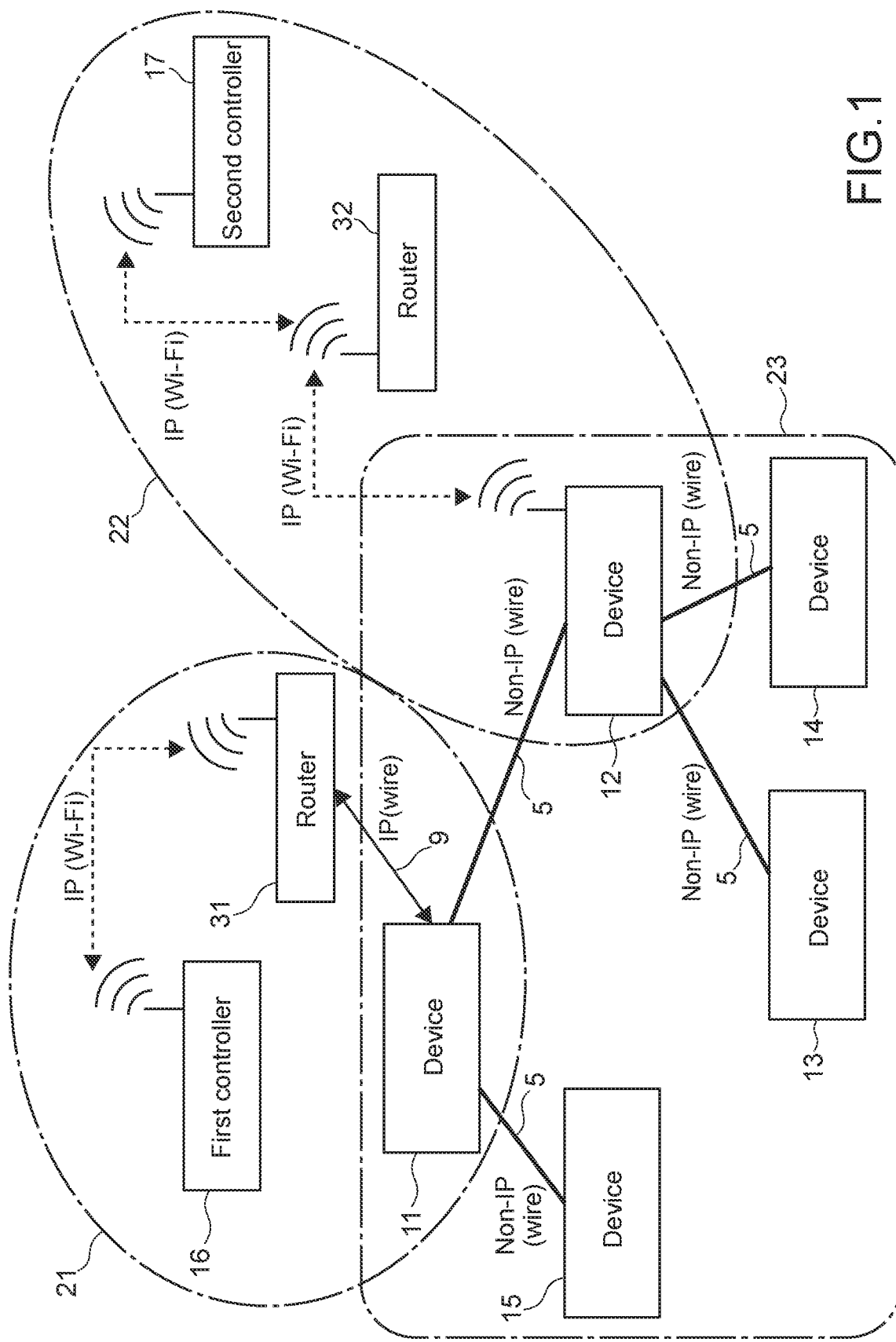
FIG. 1 is a block diagram showing a configuration of an information processing system according to an embodiment of the present technology.

FIG. 1 is a block diagram showing a configuration of an information processing system according to an embodiment of the present technology. The information processing system includes, for example, five devices 11 to 15, routers 31 and 32, a first controller 16, a second controller 17, and the like. IP networks 21 and 22 and a non-IP wire network 23 are mixed in the information processing system.

Tne devices 11 to 15 are connected to the non-IP wire network 23. Specifically, the devices are connected each other via cables 5 connected to wire interfaces (hereinafter referred to as wire IFs). As the wire IF, HDMI or SCART (Syndicat des Constructeurs d'Appareils Radiorécepteurs et Téléviseurs) is used, for example. These interfaces transmit and receive an AV stream as main data.

Among the devices 11 to 15, the devices 11 and 12 are configured to be capable of communicating by IP. The devices 13 to 15 do not correspond to the IP. The devices 11 to 15 are home appliance devices such as a TV, an amplifier and a playback device as described later.

In an IP network of the information processing system, two network segments, e.g., a first segment 21 and a second segment 22 are present. In an OSI reference model, an network connected by first and second layers is taken as one segment. Specifically, one segment configures one LAN, and the segment is typically present for each router.

The first controller 16, the router 31, and the device 11 belong to the first segment 21. The second controller 17, the router 32, and the device 12 belong to the second segment 22. The device 11 is connected to the router 31, for example, through a LAN (Local Area Network) cable 9. The first controller 16 is connected to the router 31 through a wireless LAN (Local Area Network) (e.g., Wi-Fi). The device 12 and the second controller 17 are connected to the router 32 through the Wi-Fi.

The first controller 16 and the second controller 17 are mobile computers such as a smartphone and a tablet terminal, for example. The first controller 16 and the second controller 17 are configured to be operated by a user and generate a control command based on an input operation. In the following description, the control command transmitted and received via the IP (via an IP communication section 52 described later) is conveniently referred to as an "IP control command".

Figure 2:
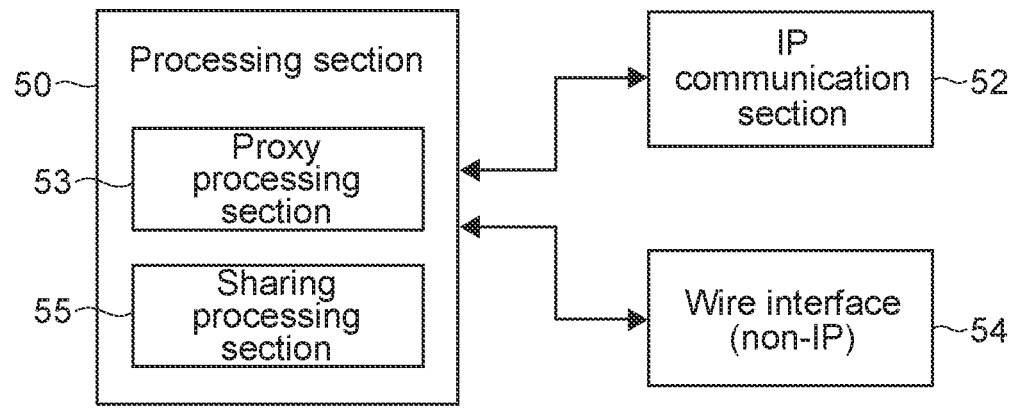
FIG. 2 is a block diagram showing a configuration of a device belonging to a first segment (or second segment) and connected to a wire network.

FIG. 2 is a block diagram showing a configuration of the device 11 (or 12). The device 11 (or 12) includes a processing section 50, IP communication section 52, and a wire IF 54.

The processing section 50 includes a proxy processing section 53 and a sharing processing section 55. The processing section 50 is configured mainly of basic hardware of a computer such as a CPU, a RAM and ROM. The ROM stores necessary programs.

The IP communication section 52 is a communication module configured to be capable of communicating by the IP, and functions as a "first communication section." A communication function by the wire IF 54 functions as a "second communication section."

The proxy processing section 53 generates the control command using the wire IF on the basis of the IP control command received by the device 11 (12) from the first controller 16 (second controller 17), and executes a proxy control in the wired network 23 on the basis of a generated wire control command. In the following description, the control command transmitted and received via the wire IF is conveniently referred to as a "wire control command."

For example, the proxy processing section 53 stores a table that associates the IP control command with the wire control command, to thereby converting the IP control command to the wire control command corresponding thereto.

Note that the device 11 functions as an information processing device (first information processing device) and the device 12 functions as a second information processing device. The devices connected to the wire network 23 (e.g., devices 13 to 15) other than the devices 11 and 12 function as third information processing devices.

In a case where the wire IF 54 is, for example, the HDMI, examples of the wire control command include, for example, the control command of a CEC (Consumer Electronics Control) (CEC command).

Note that the HDMI realizes a control between the devices in the HDMI network by exchanging the control command using each CEC line in the cables 5 by use of an physical address and a logic address.

The sharing processing section 55 is configured to store related information relating to the proxy control by the proxy processing section 53 of the device 11 (12), and execute processing of sharing the related information between the devices 11 and 12.

The related information included in the sharing processing section 55 of the device 11 is the information relating to the proxy control by the device 11 that is a proxy device in the first segment 21. Hereinafter, it is referred to as first related information. In other words, the first related information is related information for which the device 11 controls other devices 12 to 15 in the wire network 23 as a proxy on the basis of the IP control command from the first controller 16.

The related information included in the sharing processing section 55 of the device 12 is the information relating to the proxy control by the device 12 that is the proxy device in the second segment 22. Hereinafter, it is referred to as second related information. In other words, the second related information is related information for which the device 12 controls other devices 11, 13 to 15 in the wire network 23 as a proxy on the basis of the IP control command from the second controller 17.

Here, since the device 11 belongs to the first segment 21 and the device 22 belongs to the second segment 22, respectively, the devices 11 and 12 are separated on the IP. However, the present technology focuses on that the devices 11 and 12 are connected by the wire IF 54. In other words, the devices 11 and 12 are capable of communicating each other by using the wire control command that is the control command based on the standard of the wire IF 54.

Figure 3:
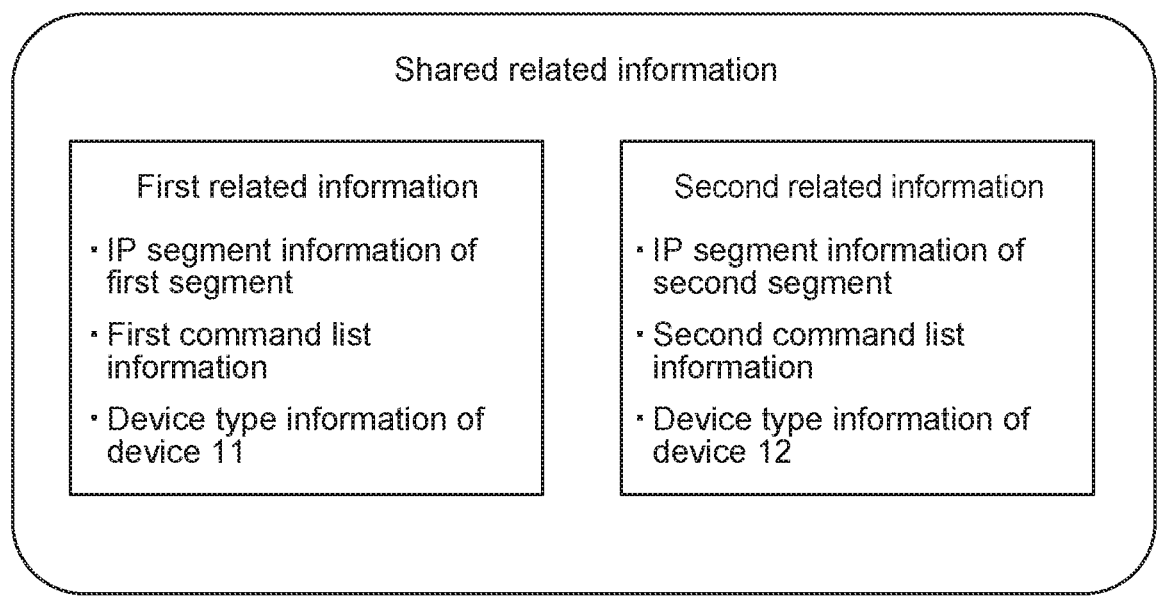
FIG. 3 shows examples of related information capable of being shared by the device shown in FIG. 2.

FIG. 3 shows examples of the related information capable of being shared by the devices 11 and 12.

The first related information includes, for example, IP segment information of the first segment 21 and list information of the wire control command corresponding to the IP control command of the first controller 16. The above-described IP segment information is information showing which segment it is. The list information of the above-described wire control command is list information of the wire control command to which the device 11 can correspond. Hereinafter, the list information is referred to as first command list information. The first related information may include information (device type information) showing a type of the device 11.

The second related information includes, for example, IP segment information of the second segment 22 and list information of the wire control command corresponding to the IP control command of the second controller 17. The list information is specifically list information of the wire control command to which the device 12 can correspond. Hereinafter, the list information is referred to as second command list information. The second related information may include information showing a type of the device 12.

Note that the device 11 and the first controller 16 may store the shared related information (first and second related information) to a database in common or own databases. Similarly, the device 12 and the second controller 17 may store the shared related information (first and second related information) to a database in common or own databases.

As described later, the device 11 provides the device 12 with the first related information and acquires the second related information from the device 12. Similarly, the device 12 provides the device 11 with the second related information and acquires the first related information from the device 11. Specifically, the sharing processing section 55 of the devices 11 or 12 shares the same information. In this manner, the following effects are provided.

As a first effect, since the devices 11 and 12 recognize respective statuses in the first segment 21 and the second segment 22 each other, it is capable of avoiding a conflict of a non-IP control system, i.e., a collision of the wire control command. Since the first segment 21 and the second segment 22 are separated each other on the IP, the wire control command based on each IP control command from the first controller 16 and the second controller 17 may collide between the devices 11 and 12, in a case where the information is not shared with the sharing processing section 55. The sharing processing section 55 shares both pieces of first and second related information such that such collision can be avoided.

As a second effect, the device 11 performs, as a proxy of the first controller 16, a control executed by the device 12 in the second segment 22 to which the device 11 does not belong. Similarly, the device 12 performs, as a proxy of the second controller 17, a control executed by the device 11 in the second segment 21 to which the device 12 does not belong. Specifically, a command capable of being issued by the first controller 16 and the second controller 17 can be extended.

2. Action of Information Processing System

Figure 4:
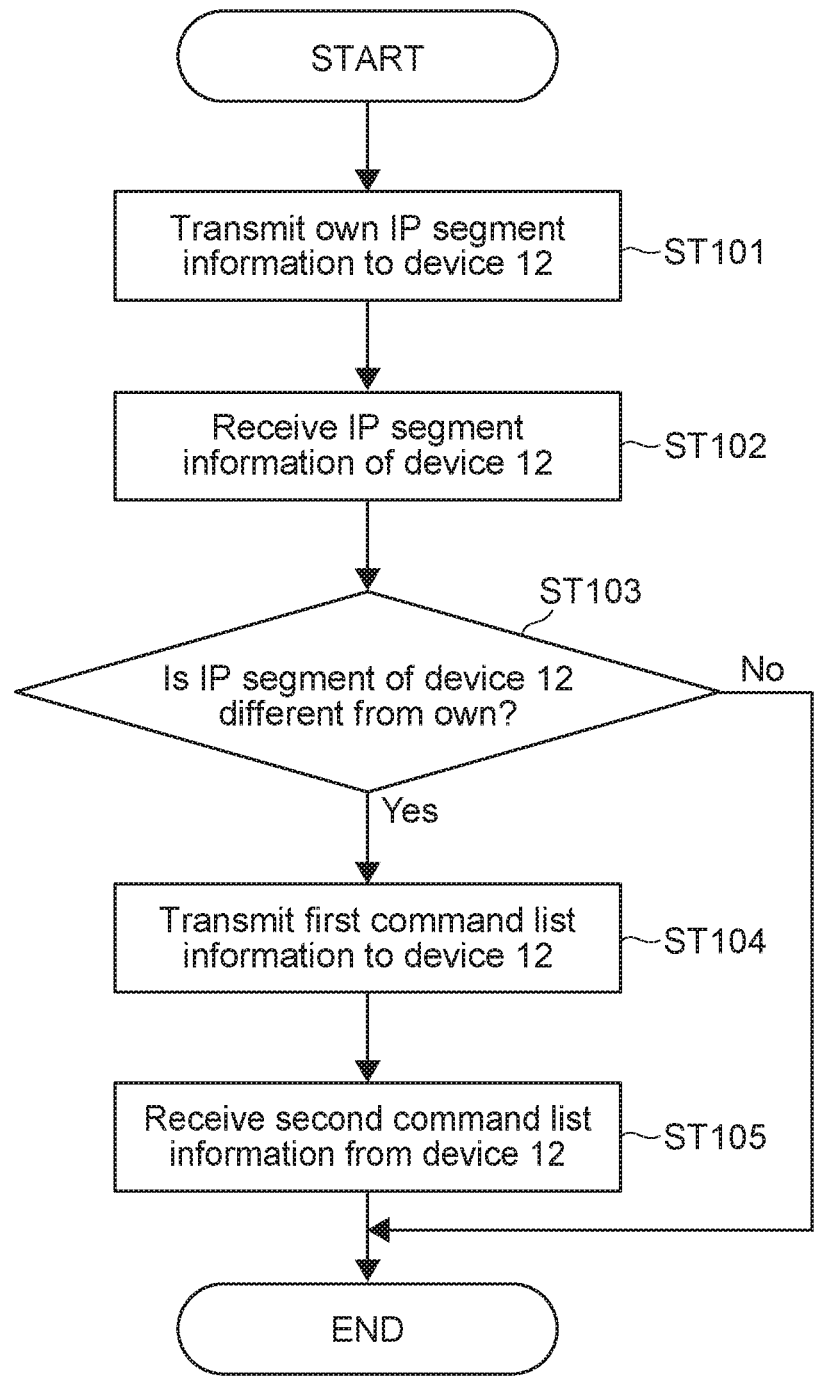
FIG. 4 is a flowchart showing a basic action of the device shown in FIG. 2.

FIG. 4 is a flowchart showing a basic action of the device 11 in the information processing system. The flowchart shows an action of an initial setting performed when the device 11 is connected to the IP network and the non-IP network, for example, shown in FIG. 1 and the device 11 is turned on. A communication in this action is executed via the wire IF 54. At an initial time, the devices 11 and 12 do not recognize that they belong to different segments each other.

The sharing processing section 55 of the device 11 transmits the above-mentioned own IP segment information (IP segment information of first segment 21) of the first related information to the device 12 (Step (hereinafter, ST) 101). In practice, as described later, the device 11 desirably broadcasts (simultaneous announcement) the own IP segment information to other devices 12 to 15.

The sharing processing section 55 of the device 12 similarly transmits the own IP segment information (IP segment information of second segment 22) to the device 11. In practice, as described later, the device 12 desirably broadcasts the own IP segment information to other devices 11, 13 to 15.

The sharing processing section 55 of the device 11 receives the IP segment information transmitted by the device 12 (ST102). The device 12 similarly receives the IP segment information transmitted by the device 11.

The processing section 50 of the device 11 determines whether or not the IP segment information of the device 12 received in ST102 is different from the own IP segment information (ST103). In a case where these IP segments are different, the sharing processing section 55 of the device 11 transmits the first command list information of the first related information to the device 12 (ST104).

For example, in a case where the device 12 also executes determination processing similar to the processing in ST 103 and it is determined as Yes, the sharing processing section 55 of the device 11 transmits the second command list information to the device 11 similar to the processing in ST104.

Then, the sharing processing section 55 of the device 11 receives the second command list information from the device (ST105). The device 12 receives the first command list information from the device 11 as well.

Note that ST104 and 105 may be performed before Step 103. In other words, as a flowchart of FIG. 6 as described later, the device 11 may transmit all pieces of first related information at a time to the device 12 in ST101 and receive all pieces of information of the second related information in ST102 from the device 12.

As above, even if the devices 11 and 12 belong to respective different segments, the devices 11 and 12 share the related information relating to the proxy control by using the non-IP wire IF 54 each other. In this manner, as described as the above-described first effect, it is possible to avoid the collision of the wire control command between the devices 11 and 12.

The first controller 16 and the second controller 17 will become possible to recognize that there is a possibility to collide the control between the first controller 16 and the second controller 17 such as input switching or a volume operation of a TV as the device 11, for example. In this manner, the information processing system will become possible to execute processing of avoiding the collision in advance, or to rapidly correspond at the time of the collision.

As a concrete method of avoiding the collision, a priority may be set for each IP control command (or wire control command), for example. The device 11 (12) is capable of executing the proxy control in accordance with the priority.

The above-described second effect will be described in detail in a typical embodiment of the following information processing system.

3. Typical Embodiment of Information Processing System

Figure 5:
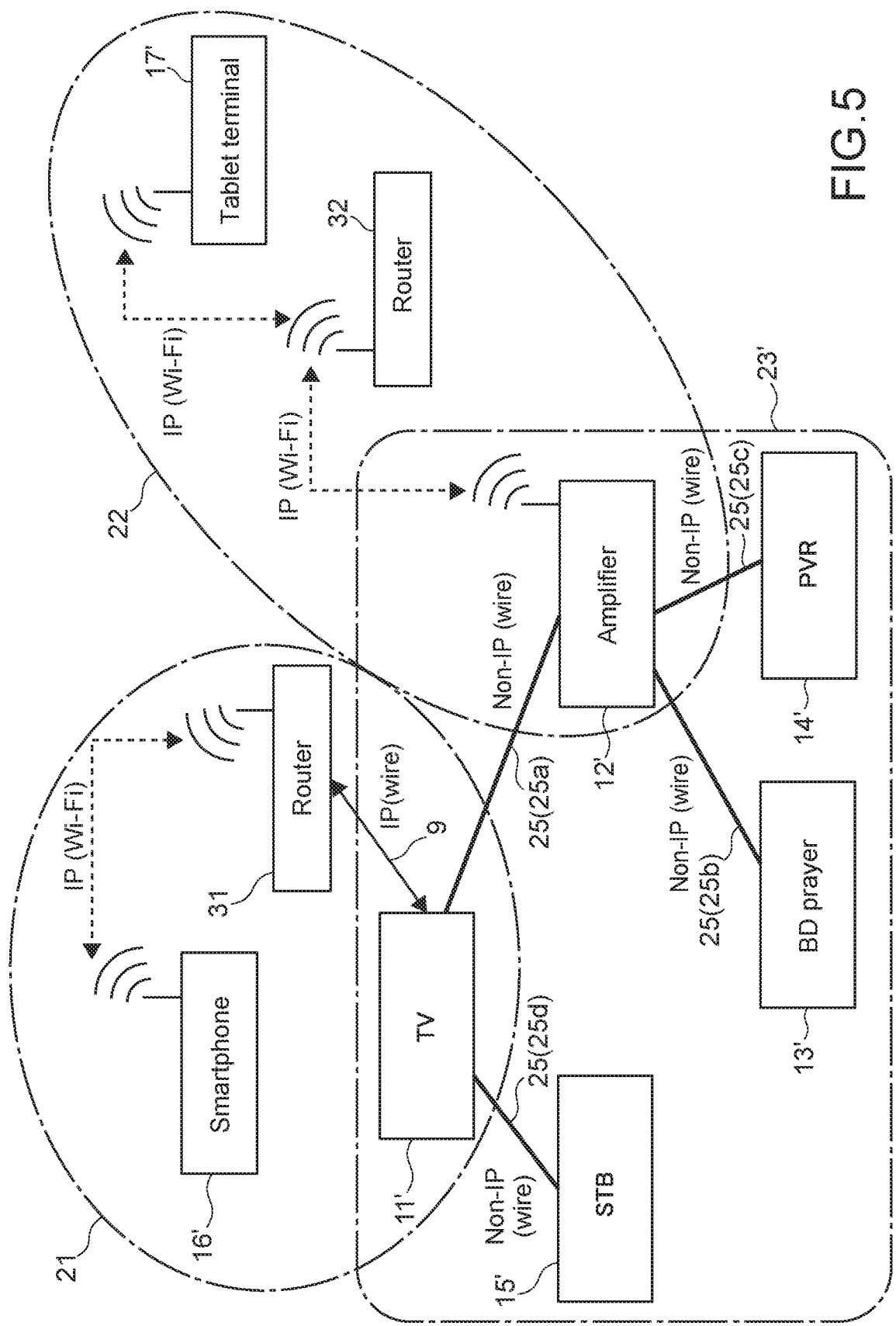
FIG. 5 is a block diagram showing a typical embodiment of the information processing system.

FIG. 5 is a block diagram showing a typical embodiment of the information processing system. The devices 11 to 15 shown in FIG. 1 correspond to devices 11' to 15' shown in FIG. 5 as follows, for example. The device 11 corresponds to a TV 11', the device 12 corresponds to an amplifier 12', the device 13 corresponds to a BD (Blu-ray Disc) player 13', the device 14 corresponds to a PVR (Personal Video Recorder) 14', and the device 15 corresponds to an STB (Set Top Box) 15', respectively.

The first controller 16 corresponds to a smartphone 16' and the second controller 17 corresponds to a tablet terminal 17'. The cables 5 corresponds to HDMI cables 25 (25*a* to 25*d*).

As one of the CEC commands in the HDMI, for example, each device corresponds to "One Touch Play". Thus, when a user presses a playback button of the BD player 13', the input switching of the TV 11' is automatically executed, the TV 11' is turned on as necessary, and a playback video image of the BD player 13' is displayed on the TV 11'.

The TV 11' and the amplifier 12' are connected through the HDMI cable 25*a* and the amplifier 12' and the BD player 13' are connected through the HDMI cable 25*b*. Accordingly, when the user presses the playback button of the BD player 13', a video image is automatically displayed on the TV 11' that displays the video image naturally expected to be displayed, and no operations such as the input switching and turning on are necessary. In addition, the information processing system forms a topology of wire connection by the HDMI cables 25 such that a display apparatus expected by the user will be selected with certainty.

As described above, the devices between the two different segments in the IP network are incapable of performing the communication via the IP. Specifically, although the TV 11' and the amplifier 12' mount the communication function by the IP connection, they belong to different segments each other and are thus incapable of directly performing the communication on the IP. There are reasons for such network configuration.

For example, in order to realize efficient transmission of large capacity network content to the TV 11', a case of using the configuration of the information processing system is considered. In this case, the user tries to perform the communication by the TV 11' in the form of avoiding effects from other devices as low as possible. Therefore, the user considers that the TV 11' is purposely arranged in the first segment 21 different from the second segment 22 to which the amplifier 12' for performing control communication belongs.

Here, one of a plurality of users operates the TV 11' belonging to the first segment 21 via the smartphone 16'. On the other hand, another one user operates the amplifier 12' belonging to the second segment 22 via the tablet terminal 17'. Specifically, since the TV 11' and the amplifier 12' each includes the proxy function of CEC command communication in the HDMI network 23', each user is possible to perform such operation. Thus, the user can be provided with an advanced GUI control and useful functions explicitly shown by the user as compared with the proxy function in a case where a general remote controller utilizing infrared rays is used.

However, as the TV 11' and the amplifier 12' in the HDMI network are incapable of sharing IP communication each other, the communication between the devices may be collided in a case where the IP control command is converted into the CEC command so as to try to execute the control between the devices.

Then, in order to solve the problem, according to the present technology, the information relating to each proxy control is to be exchanged between the TV 11' and the amplifier 12' each having the proxy function by using the CEC command. In other words, this is sharing processing of related information relating to the above-mentioned proxy control.

Specific examples of the CEC command will be shown below.

<Report Proxy Profile>["Device Type"]["IP Segment"] ["Command List"] (1)
<Request Proxy Profile> (2)

The command (1) is an example command to notify each device in the HDMI network to which the TV 11' and the amplifier 12' each having the proxy function are connected. As described above, these are commands to notify each piece of information (related information) of an own device type, the IP segment, and the command list.

The TV 11' and the amplifier 12' may notify other devices by broadcast of the command (1) at a timing in which they are connected to the HDMI network.

Alternatively, the TV 11' and the amplifier 12' may directly notify a requester device of the command (1) at a requested timing. The command (2) is a command that requests the command (1) to notify at that case.

Figure 6:
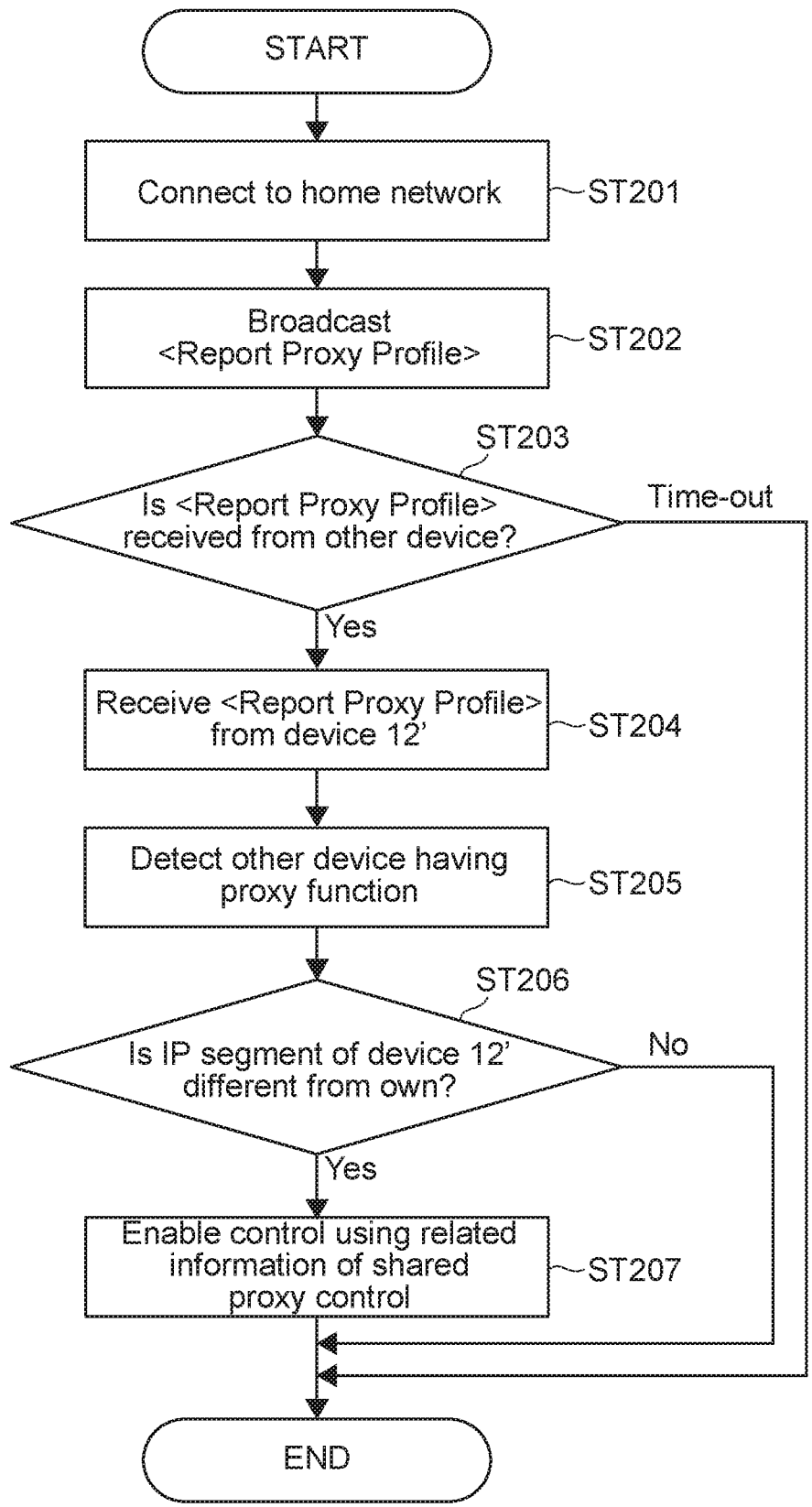
FIG. 6 is a flowchart showing an action of a TV in a case where a command (1) is notified by broadcast.

FIG. 6 is a flowchart showing an action of the TV 11' (mainly, sharing processing section 55) in a case where the command (1) is notified by broadcast. This flowchart more specifically show the flowchart of FIG. 4.

The TV 11' is connected to a home network (IP network and HDMI network 23' of first segment 21) (ST201). Then, the TV 11' broadcasts <Report Proxy Profile> of the above-described command (1) (ST202). The TV 11' enters a standby status of receiving <Report Proxy Profile> from other devices (including amplifier 12') (ST203). The amplifier 12' also executes the processing similarly.

Next, the TV 11' receives <Report Proxy Profile> from the amplifier 12' (ST204). In this manner, the TV 11' detects that the amplifier 12' is present as a device having other proxy function in the same HDMI network 23' (ST205).

Furthermore, the TV 11' determines that the amplifier 12' belongs to the second segment 22 different from the first segment 21 on the basis of the related information received in ST204 (Yes in ST206). Then, the TV 11' enables a link function to the proxy function of the amplifier 12' and performs a control by using the related information of the proxy control shared with the amplifier 12' (ST207).

Similarly, the amplifier 12' detects that the TV 11' is present as a device having other proxy function in the same HDMI network 23' corresponding to the processing in ST205. In addition, the amplifier 12' determines that the TV 11' belongs to the first segment 21 different from the second segment 22 corresponding to the processing in ST206 and performs a control by using the related information of the proxy control shared by the TV 11' corresponding to the processing in ST207.

Thus, the TV 11' and the amplifier 12' each belonging to different first segment 21 and second segment 22 are capable of avoiding a collision of the CEC commands by using the shared related information. This is the above-described first effect.

The above-described second effect will be described in below by using this embodiment. The second effect is that the CEC commands to be corresponded in the proxy devices, i.e., the TV 11' and the amplifier 12, can be extended.

Specifically, the respective CEC commands and the device type information are linked. For example, a command <Record On> for recording broadcast wave content viewing in the TV 11' by a PVR 14' is defined as a command to be transmitted from a device type "TV" to a device type "Recording Device" (corresponding device is PVR 14'). Here, it assumes a case that the video image viewed by the user is recorded by using the PVR 14'. In this case, the user tries to control by the command <Record On> using the tablet terminal 17'.

However, the device type of the amplifier 12' is defined as "Audio Device". Accordingly, the amplifier 12' that receives a request of the control by the command <Record On> is incapable of directly transmitting the command <Record On> to the PVR 14'. That is to say, the command <Record On> is a defined command incapable of being executed by the amplifier 12'.

Then, the amplifier 12' requests the TV11' to issue the CEC command. The amplifier 12' already recognizes that the TV11' corresponds to <Record On> by the command <Proxy Profile> in ST204. In a case where an issue of the CEC command is requested, specific examples of the CEC command will be described below.

<Request Command Submit>["ID", "<Command>[Parameter]"] (3)
<Respond Command Submit>["ID", "<Command>[Parameter]"] (4)

In the command (3), an ID is specified as a parameter and a response thereof is recognized. The command (4) is an answer command to the request for the issue of the command specified by the ID.

Figure 7:
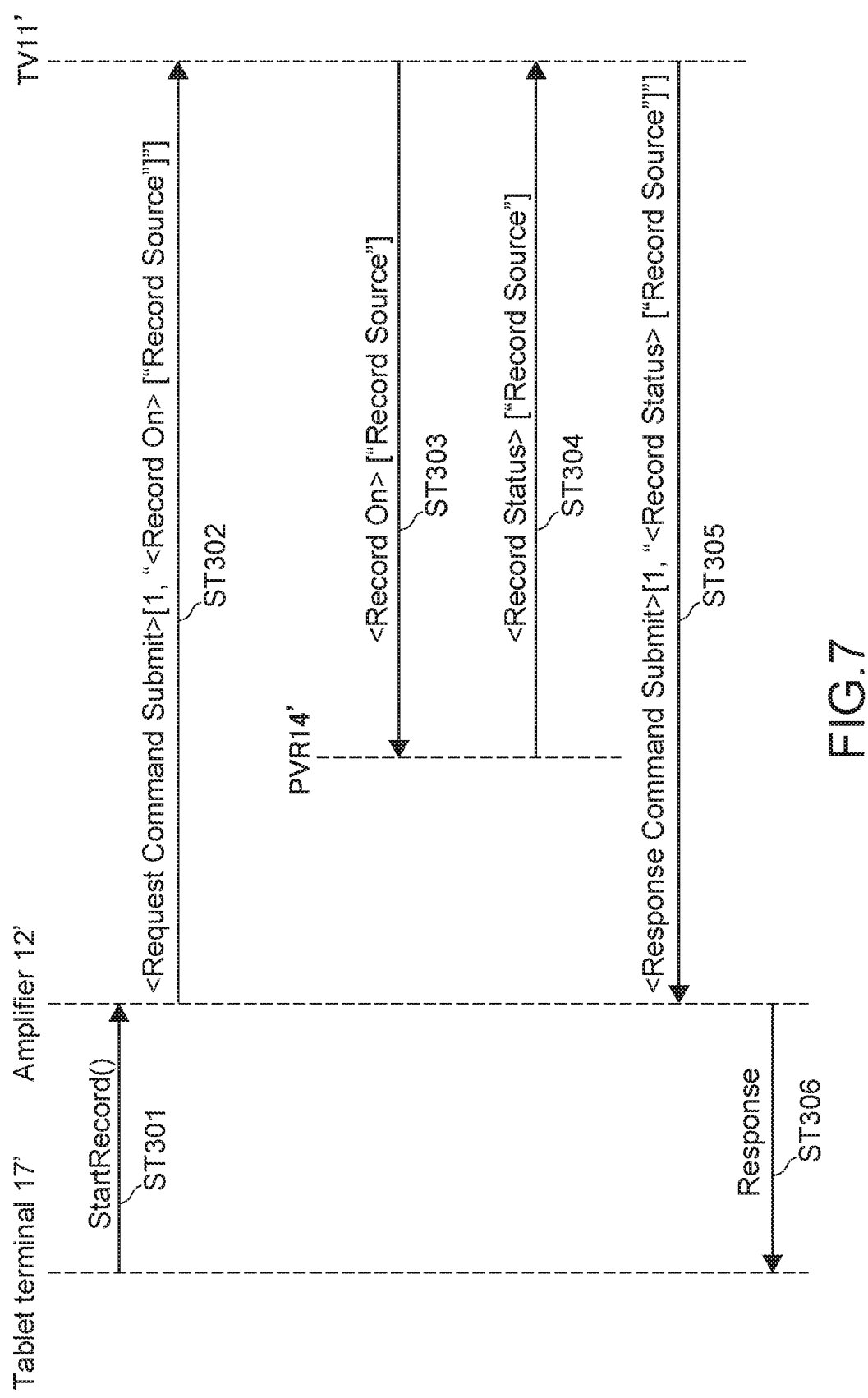
FIG. 7 is a sequence diagram in a case where a control request is made by a command <Record On>.

FIG. 7 is a sequence diagram in a case where a control request is made by the command <Record On>. StartRecord( ) in ST301 is an example command of a request for recording issued from the tablet terminal 17' to the amplifier 12' on the IP.

The amplifier 12' receives the request StartRecord( ) and transmits the above-described command (3), specifically <Request Command Submit>[1, "<Record On>["Record Source"]"] to the TV 11' (ST302). In this case, when it requests to record the video image being received by the TV 11', for example, the ["Record Source"] section may be blank to express the request or the amplifier 12' may inquire of the TV11' with a <Give Tuner Device Status> command.

The TV 11' receives it and transmits the command of the request for recording <Record On>["Record Source"] to the PVR 14' (ST303). The PVR 14' returns a command <Record Status>["Record Source"] showing a status that recording is started to the TV 11' (ST304). Then, the TV 11' receives it and transmits a command <Response Command Submit>[1, "<Record Status>["Record Source"]"] showing a status of recording to the amplifier 12' (ST305). The amplifier 12' transmits a response corresponding thereto to the tablet terminal 17' (ST306).

As a still another effect according to the present technology, an IP-based control can be shared between different segments. For example, an IP-based device control command such as Control4 corresponds between the smartphone 16' and the TV 11', or the tablet terminal 17' and the amplifier 12'. The Control4 is a control system used in a Home Automation System and a Smart Home System. In the information processing system according to the present technology, since the tablet terminal 17' and the TV 11' belong to the different segments, the tablet terminal 17' is incapable of directly transmitting the control command of the Control4 to the TV 11'.

Then, in the sharing processing shown in FIG. 6, the TV 11' and the amplifier 12' exchanges information showing that they correspond to a Control4 command and list information of the corresponding command. In other words, as one piece of the related information to be shared, such information is to be included.

The amplifier 12' that acquires the information showing that the TV 11' corresponds to the Control4 and the list information of the corresponding command reports to the tablet terminal 17' via the IP in a separately defined manner that the TV 11' is capable of receiving the corresponding command via the amplifier 12'.

In this manner, the tablet terminal 17' becomes possible to transmit the Control4 command to the TV 11' belonging to different segments via the amplifier 12'. In this case, the amplifier 12' may encapsulate the Control4 command of the IP in the CEC command and transmit it to the other component. An actual example of the CEC command is shown below in that case.

<Other Protocol Container>["Control 4 command"] (5)

In the command (5), only a direct address command is defined.

As described above, by sharing the related information between the TV 11' and the amplifier 12', in the control by the tablet terminal 17' via the IP, the amplifier 12' can request the TV 11' to execute the CEC command that is incapable of being executed by own and vice versa. That is to way, in the control by the smartphone 16' via the IP, the TV 11' can request the amplifier 12' to execute the CEC command that is incapable of being executed by own.

However, it is not limited to a mode that the amplifier 12' always requests the TV 11' to execute the CEC command that is incapable of being executed by own. For example, if the CEC command is capable of being executed by the amplifier 12' and is also capable of being executed by the TV 11', the amplifier 12' requests the TV 11' to do so and the TV 11' may execute it on behalf of the amplifier 12'. Similarly, if the CEC command is capable of being executed by the TV 11' and is also capable of being executed by the amplifier 12', the TV 11' requests the amplifier 12' to do so and the amplifier 12' may execute it on behalf of the TV 11'.

4. Modification

The present technology is not limited to the above-described embodiment s, and other various embodiments may be realized.

In the above-described embodiments, as the wire control command, the CEC command in the HDMI is shown as an example. However, in the future, if another dual-directional data channel is defined on the HDMI, a control command utilizing the data channel may be used in place of the CEC command. Also, the wire control command is applicable to a control command in a non-IP wire interface other than the HDMI.

In the above-described embodiments, the information processing system including the two different segments is described. However, the information processing system may include three or more different segments and three or more devices each having a proxy function and each belonging to the segments.

It is possible to combine at least two features of the respective embodiments described above.

The present technology may also have the following structures.

(1)

An information processing device, including:

a first communication section configured to perform communication based on an IP (Internet Protocol) in a first segment of an IP network;

a second communication section configured to perform communication with one or more other information processing devices via a non-IP wire interface;

a proxy processing section configured to generate a wire control command that is a control command using the wire interface on the basis of an IP control command that is a control command received from a first controller at least belonging to the first segment via the first communication section, and to execute a proxy control on the basis of the wire control command by using the second communication section; and a sharing processing section configured to share related information relating to the proxy control by the proxy processing section with a second information processing device belonging to a second segment different from the first segment among the one or more other information processing devices by using the second communication section.

(2)

The information processing device according to (1), in which the sharing processing section is configured to transmit first related information relating to the proxy control by the information processing device to the second information processing device as the related information, and receive second related information relating to the proxy control by the second information processing device from the second information processing device.

(3)

The information processing device according to (2), in which the sharing processing section is configured to transmit, as the first related information, IP segment information of the first segment and list information of the wire control command corresponding to the IP control command of the first controller to the second information processing device.

(4)

The information processing device according to (2) or (3), in which the sharing processing section is configured to receive, as the second related information, IP segment information of the second segment and list information of a wire control command corresponding to an IP control command generated at a second controller belonging to the second segment from the second information processing device.

(5)

The information processing device according to (4), in which the sharing processing section is configured to determine whether or not a segment of the IP network to which the second information processing device belongs is different from the first segment.

(6)

The information processing device according to any one of (1) to (6), in which the proxy processing section is configured to receive a wire control command generated by the second information processing device on the basis of an IP control command generated by a second controller belonging to the second segment by using the second communication section, and execute the proxy control on the basis of the received wire control command.

(7)

The information processing device according to (6), in which the wire control command generated on the basis of the IP control command generated by the second controller is a command defined such that the second information processing device is incapable of executing the command.

(8)

An information processing method by an information processing device including a first communication section configured to perform communication based on an IP (Internet Protocol) in a first segment of an IP network and a second communication section configured to perform communication with one or more other information processing devices via a non-IP wire interface, including:

sharing related information relating to a proxy control by the information processing device with a second information processing device belonging to a second segment different from the first segment among the one or more other information processing devices by using the second communication section;

generating a wire control command that is a control command using the wire interface on the basis of an IP control command that is a control command received from a first controller at least belonging to the first segment via the first communication section; and executing the proxy control on the basis of the wire control command by using the second communication section.

(9)

An information processing system, including:

a first information processing device belonging to a first segment of an IP (Internet Protocol) network; and a second information processing device belonging to a second segment different from the first segment of the IP network, and connected to the first information processing device via a non-IP wire interface, in which the first information processing device includes a first communication section configured to perform communication based on an IP in the first segment;

a second communication section configured to perform communication with one or more other information processing devices including the second information processing device via the wire interface;

a proxy processing section configured to generate a wire control command that is a control command using the wire interface on the basis of an IP control command that is a control command received from a first controller at least belonging to the first segment via the first communication section, and to execute a proxy control on the basis of the wire control command by using the second communication section; and a sharing processing section configured to share related information relating to the proxy control by the proxy processing section with a second information processing device by using the second communication section.

REFERENCE SIGNS LIST 5 (for wire IF) cable
9 LAN cable
11 to 15 device
11' TV
12' amplifier
16 first controller
16' smartphone
17 second controller
17' tablet terminal
21 first segment
22 second segment
23 wire network
23' HDMI network
31, 32 router
50 processing section
52 IP communication section
53 proxy processing section
54 wire IF
55 sharing processing section

The invention claimed is:

1. A first information processing device, comprising:
circuitry configured to:
communicate, based on an Internet Protocol (IP), in a first segment of an IP network;
communicate, via a non-IP wire interface, with a second information processing device of a plurality of information processing devices;
generate a first wire control command based on a first IP control command received from a first controller which belongs to the first segment,
wherein
the first IP control command is received via the communication based on the IP, and
the first wire control command is a control command generated using the non-IP wire interface;
execute a proxy control based on the first wire control command by using the communication via the non-IP wire interface; and
share first related information, associated with the proxy control by the first information processing device, with the second information processing device based on the communication via the non-IP wire interface, wherein
the shared first related information comprises the generated first wire control command, and
the second information processing device belongs to a second segment different from the first segment.

2. The first information processing device according to claim 1, wherein the circuitry is further configured to receive second related information, associated with a proxy control by the second information processing device, from the second information processing device via the non-IP wire interface.

3. The first information processing device according to claim 2, wherein the shared first related information comprises IP segment information of the first segment and list information of the first wire control command, corresponding to the first IP control command, of the first controller.

4. The first information processing device according to claim 2, wherein
the second related information comprises IP segment information of the second segment and list information of a second wire control command,
the second wire control command corresponds to a second IP control command generated at a second controller which belongs to the second segment.

5. The first information processing device according to claim 4, wherein the circuitry is further configured to execute the proxy control by the first information processing device based on the second wire control command from the received second related information.

6. The first information processing device according to claim 5, wherein the second information processing device determines whether the first information processing device is capable of executing a command, which is not executable by the second information processing device, based on the shared first related information.

7. An information processing method, comprising:
in a first information processing device:
communicating, based on an Internet Protocol (IP), in a first segment of an IP network;
communicating, via a non-IP wire interface, with a second information processing device of a plurality of information processing devices;
share related information, associated with a proxy control by the first information processing device, with the second information processing device based on the communication via the non-IP wire interface, wherein the second information processing device belongs to a second segment different from the first segment;

generating a wire control command based on an IP control command received from a first controller belonging to the first segment, wherein
   the IP control command is received via the communication based on the IP,
   the wire control command is a control command generated using the non-IP wire interface, and
   the shared related information comprises the generated wire control command; and executing the proxy control based on the wire control command by using the communication via the non-IP wire interface.

8. An information processing system, comprising:
a first information processing device belonging to a first segment of an Internet Protocol (IP) network; and
a second information processing device belonging to a second segment different from the first segment of the IP network,
wherein
   the second information processing device is connected to the first information processing device via a non-IP wire interface,
   the first information processing device includes:
      circuitry configured to:
         communicate, based on an IP in the first segment of the IP network;
         communicate, via a non-IP wire interface, with the second information processing device;
         generate a wire control command based on an IP control command received from a first controller which belongs to the first segment, wherein
            the IP control command is received via the communication based on the IP, and
            the wire control command is a control command generated using the non-IP wire interface;
         execute a proxy control based on the wire control command by using the communication via the non-IP wire interface; and
         share related information, associated with the proxy control by the first information processing device, with the second information processing device based on the communication via the non-IP wire interface, wherein the shared related information comprises the generated wire control command.

* * * * *